(12) United States Patent
Venkatesh (10) Patent No.: US 12,160,544 B2
(45) Date of Patent: *Dec. 3, 2024

(54) METHODS FOR CONFIGURING SERVER COMMUNICATIONS

(71) Applicant: The Toronto-Dominion Bank, Toronto (CA)

(72) Inventor: Abhijith Venkatesh, Whitby (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,285

(22) Filed: Nov. 10, 2023

(65) Prior Publication Data

US 2024/0155055 A1 May 9, 2024

Related U.S. Application Data (63) Continuation of application No. 17/955,897, filed on Sep. 29, 2022, now Pat. No. 11,856,118.

(51) Int. Cl.
*H04M 3/00* (2024.01)
*H04L 5/00* (2006.01)
*H04M 3/51* (2006.01)

(52) U.S. Cl.
CPC .......... *H04M 3/5191* (2013.01); *H04L 5/003* (2013.01)

(58) Field of Classification Search
CPC ............................. H04M 3/5191; H04L 5/003
USPC ................ 379/265.01–265.14, 266.01–266.1
See application file for complete search history.

(56) References Cited

U.S. PATENT DOCUMENTS

| | | | |
|---|---|---|---|
| 8,411,841 B2 | 4/2013 | Edwards et al. | |
| 9,210,266 B2 | 12/2015 | Lum et al. | |
| 9,247,060 B2 | 1/2016 | Phelps et al. | |
| 10,055,742 B2 | 8/2018 | Phelps et al. | |
| 10,326,817 B2 | 6/2019 | Arunachalam et al. | |
| 10,447,853 B1 | 10/2019 | Ouimette et al. | |
| 10,462,216 B1 | 10/2019 | Vysotsky et al. | |
| 10,965,535 B2 | 3/2021 | Ramareddy et al. | |
| 11,146,681 B2 | 10/2021 | Matias et al. | |
| 11,314,532 B2 | 4/2022 | Borkar et al. | |
| 2013/0007576 A1* | 1/2013 | Lund .................. | H04N 21/4345 715/203 |
| 2015/0276254 A1* | 10/2015 | Nemcek .................. | G10L 15/22 700/278 |
| 2016/0103643 A1* | 4/2016 | Haas ...................... | G06F 3/1246 347/5 |
| 2016/0359983 A1* | 12/2016 | Balogh .................... | H04L 67/34 |
| 2018/0167475 A1* | 6/2018 | Agarwal ............... | H04L 63/101 |
| 2021/0075750 A1 | 3/2021 | Yoo et al. | |
| 2022/0103684 A1 | 3/2022 | Chavez et al. | |
| 2022/0141332 A1 | 5/2022 | Mitchem et al. | |
| 2023/0156155 A1* | 5/2023 | Zhang ................. | H04L 12/1831 709/204 |

* cited by examiner

*Primary Examiner* — William J Deane, Jr.
(74) *Attorney, Agent, or Firm* — Rowand LLP (57) ABSTRACT

A computer-implemented method is disclosed. The method includes: receiving a plurality of requests to initiate customer service sessions; establishing a primary web socket connection between a first web server and a service agent terminal; and for each of the plurality of requests, establishing a communication sub-channel associated with the primary web socket connection, each communication sub-channel corresponding to a respective customer service session.

20 Claims, 6 Drawing Sheets

METHODS FOR CONFIGURING SERVER COMMUNICATIONS

CROSS-REFERENCE TO RELATED APPLICATION

The present application is a continuation of U.S. patent application Ser. No. 17/955,897 filed on Sep. 29, 2022, the contents of which are incorporated herein by reference.

TECHNICAL FIELD

The present disclosure relates to data communications and, in particular, to systems and methods for configuring web server communications in connection with handling of customer contacts.

BACKGROUND

Contact centers administer centralized handling of individual communications. Various information may be routed to people or systems through a contact center. Business entities may deploy a contact center as part of their customer relationship management infrastructure. In particular, businesses may manage their customer interactions, such as technical support, customer feedback, etc., using contact centers. Contact center agents are tasked with handling inbound customer interactions as well as outbound communications (e.g., sales, customer outreach, and the like).

Traditionally, call centers were provided on-premises, with hardware and software for operating a call center being located on a business' property. Contact centers are now widely administered as a cloud offering, providing cloud-based infrastructure for routing customer interactions. Contact Center as a Service (CCaaS) is an alternative to on-premise call centers—CCaaS software solutions streamline multiple touchpoints (e.g., phone calls, live chats, email, etc.) into a single platform and allows businesses to customize various aspects of the customer experience. CCaaS offerings may include features such as call queuing, interactive voice response (IVR), and call recording. Customer service sessions that are established using an underlying CCaaS implementation motivate considerations of efficiency and effectiveness of point-to-point communications between web servers and service agent systems.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In an aspect, the present disclosure describes a computing system. The computing system includes a processor and a memory coupled to the processor. The memory stores computer-executable instructions that, when executed by the processor, configure the processor to: receive a plurality of requests to initiate customer service sessions; establish a primary web socket connection between a first web server and a service agent terminal; and for each of the plurality of requests, establish a communication sub-channel associated with the primary web socket connection, each communication sub-channel corresponding to a respective customer service session.

In some implementations, the instructions, when executed, may further configure the processor to, for each of the plurality of requests, cause a service agent session to be initiated at the service agent terminal using a respective communication sub-channel.

In some implementations, each service agent session may be associated with a respective graphical user interface (GUI) instance.

In some implementations, the instructions, when executed, may further configure the processor to: receive a termination command at the service agent terminal; and in response to receiving the terminal command, cause the primary web socket connection to be terminated together with all of the communication sub-channels.

In some implementations, establishing the primary web socket connection may include establishing a web socket connection between the first web server and a contact-center-as-a-service (CCaaS) application on the service agent terminal.

In some implementations, each of the communication sub-channels may be associated with a unique identifier generated by a CCaaS application.

In some implementations, the instructions, when executed, may further configure the processor to: receive, from the first web server, a message in connection with a customer service session; select one of the communication sub-channels to forward the message to based on determining a first unique identifier associated with the message; and forward the message to the selected communication sub-channel.

In some implementations, the instructions, when executed, may further configure the processor to cause a GUI instance associated with the selected communication sub-channel to be updated based on the message.

In some implementations, a first one of the communication sub-channels may be associated with a first line of business and at least one second communication sub-channel may be associated with a second line of business that is different from the first line of business.

In some implementations, customer service session data for a first customer service session may be only sent via a first communication sub-channel and customer service session data for a second customer service session may be only sent via a second communication sub-channel that is different from the first communication sub-channel.

In another aspect, the present disclosure describes a computer-implemented method. The method includes: receiving a plurality of requests to initiate customer service sessions; establishing a primary web socket connection between a first web server and a service agent terminal; and for each of the plurality of requests, establishing a communication sub-channel associated with the primary web socket connection, each communication sub-channel corresponding to a respective customer service session.

In another aspect, the present disclosure describes a non-transitory computer-readable storage medium. The storage medium contains instructions thereon which, when executed by a processor, configure the processor to: receive a plurality of requests to initiate customer service sessions; establish a primary web socket connection between a first web server and a service agent terminal; and for each of the plurality of requests, establish a communication sub-channel associated with the primary web socket connection, each communication sub-channel corresponding to a respective customer service session.

In another aspect, the present disclosure describes a computing system. The computing system includes a processor and a memory coupled to the processor. The memory stores computer-executable instructions that, when executed by the processor, configure the processor to: receive a first request to initiate a first customer service session; establish a primary web socket connection between a first web server and a service agent terminal; establish a first communication sub-channel associated with the primary web socket connection, the first communication sub-channel corresponding to the first customer service session; receive a second request to initiate a second customer service session; in response to receiving the second request: establish a second communication sub-channel associated with the primary web socket connection, the second communication sub-channel corresponding to the second customer service session.

In some implementations, the instructions, when executed, may further configure the processor to cause a first service agent session to be initiated at a service agent terminal using the first communication sub-channel and a second service agent session to be initiated at the service agent terminal using the second communication sub-channel.

In some implementations, the first service agent session may be associated with a first graphical user interface (GUI) instance and the second service agent session may be associated with a second GUI instance.

In some implementations, the instructions, when executed, may further configure the processor to: receive a termination command at a service agent terminal; and in response to receiving the terminal command, cause the primary web socket connection to be terminated together with the first and second communication sub-channels.

In some implementations, establishing the primary web socket connection may include establishing a web socket connection between the first web server and a contact-center-as-a-service (CCaaS) application on a service agent terminal.

In some implementations, each of the first and second communication sub-channels may be associated with a unique identifier generated by a CCaaS application.

In some implementations, the instructions, when executed, may further configure the processor to: receive, from the first web server, a message in connection with a customer service session; select one of the first and second communication sub-channels to forward the message to based on determining a first unique identifier associated with the message; and forward the message to the selected communication sub-channel.

In some implementations, the instructions, when executed, may further configure the processor to cause a GUI instance associated with the selected communication sub-channel to be updated based on the message.

In some implementations, the first communication sub-channel may be associated with a first line of business and the second communication sub-channel may be associated with a second line of business that is different from the first line of business.

In some implementations, customer service session data for the first customer service session may be only sent via the first communication sub-channel and customer service session data for the second customer service session may be only sent via the second communication sub-channel.

In another aspect, the present disclosure describes a computer-implemented method. The method includes: receiving a first request to initiate a first customer service session; establishing a primary web socket connection between a first web server and a service agent terminal; establishing a first communication sub-channel associated with the primary web socket connection, the first communication sub-channel corresponding to the first customer service session; receiving a second request to initiate a second customer service session; in response to receiving the second request: establishing a second communication sub-channel associated with the primary web socket connection, the second communication sub-channel corresponding to the second customer service session.

In another aspect, the present disclosure describes a non-transitory computer-readable storage medium. The storage medium contains instructions thereon which, when executed by a processor, configure the processor to: receive a first request to initiate a first customer service session; establish a primary web socket connection between a first web server and a service agent terminal; establish a first communication sub-channel associated with the primary web socket connection, the first communication sub-channel corresponding to the first customer service session; receive a second request to initiate a second customer service session; in response to receiving the second request: establish a second communication sub-channel associated with the primary web socket connection, the second communication sub-channel corresponding to the second customer service session.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present disclosure relates to cloud-based Contact Center as a Service (CCaaS) solutions for customer communication and interaction. A typical implementation of CCaaS provides numerous different applications that may be used by a customer service agent. An agent can log in to their account on an agent client application to engage in customer support sessions with customers. Each time a new customer service session is initiated, the user interface of the agent client application may be updated to present a new window associated with the session. The underlying software obtains a new web socket connection with a backend server associated with the CCaaS platform. This workflow results in creation of a large number of channels, placing a significant burden on the processing resources of the server.

Various technical solutions for facilitating efficient operation of contact centers that support large volumes of customer contacts are described in the present disclosure.

Figure 1:
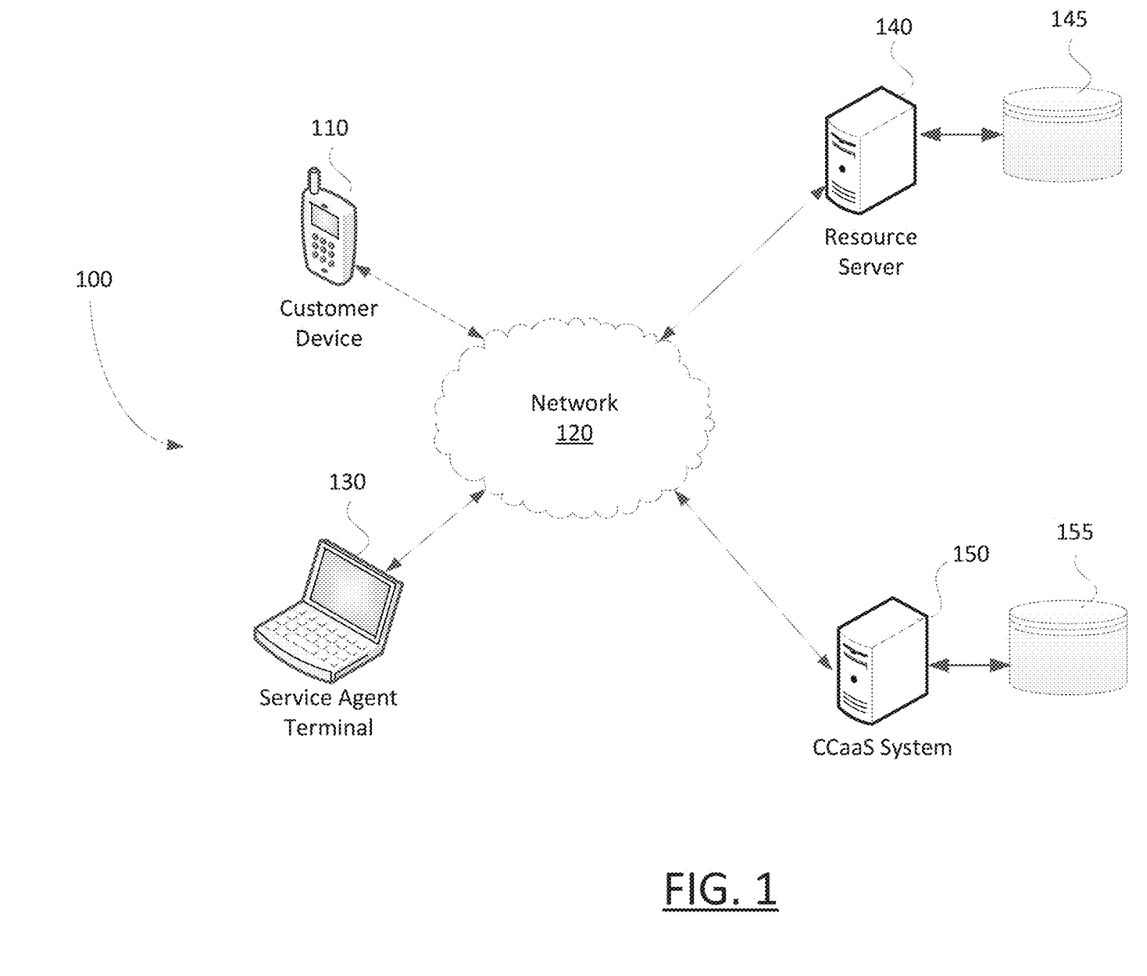
FIG. 1 is a schematic operation diagram illustrating an operating environment of an example embodiment.

FIG. 1 is a schematic diagram illustrating an operating environment of an example embodiment. In particular, FIG. 1 illustrates exemplary components of a networked system 100 for processing customer contacts. As a specific example, the system of FIG. 1 may be implemented to facilitate handling of service requests, such as order inquiries, technical support requests, etc., originating from customer devices. As a customer interacts in real-time with a service request interface, the customer may provide data which can be used by one or more service agents to handle and suitably respond to the service request.

As illustrated, a resource server 140 (which may also be referred to as a server computer system) and customer device 110 communicate via the network 120. The customer device 110 is a computing device that may be associated with an entity, such as a user or client, having resources associated with the resource server 140. For example, the resource server 140 may track, manage, maintain, and/or lend resources to the entity. The resources may, for example, be computing resources, such as memory or processor cycles. By way of further example, the resources may include stored value, such as fiat currency, which may be represented in a database. For example, the resource server 140 may be coupled to a database 145, which may be provided in secure storage. The secure storage may be provided internally within the resource server 140 or externally. The secure storage may, for example, be provided remotely from the resource server 140. For example, the secure storage may include one or more data centers. The data centers may, for example, store data with bank-grade security.

The database 145 may include records for a plurality of accounts and at least some of the records may define a quantity of resources associated with an entity. For example, the entity that is associated with the customer device 110 may be associated with an account having one or more records in the database. The records may reflect a quantity of stored resources that are associated with the entity. Such resources may include owned resources and, in at least some implementations, borrowed resources (e.g., resources available on credit). The quantity of resources that are available to or associated with an entity may be reflected by a balance defined in an associated record such as, for example, a bank balance.

The resource server 140 may, for example, be a financial institution server and the entity may be a customer of a financial institution operating the financial institution server. In some implementations, the resource server 140 may be a server that is associated with and/or operated by an insurance company.

The customer device 110 may be used, for example, to generate customer service requests. A customer service request may be directed to a specific entity, such as an employer, merchant, etc. via a contact center associated with such entity. For cloud-based implementations of contact centers, customer service requests may be directed to a computing system (e.g., server) associated with the contact center and routed to one or more selected service agents affiliated with the contact center. In particular, a plurality of different customer service requests may be routed to an individual service agent affiliated with a contact center for processing.

A cloud-based contact center may facilitate an omnichannel customer experience. That is, an omnichannel contact center may be capable of handling customer contacts that are forwarded to the contact center using various modes of communication such as phone calls, emails, text messages, social media, chatbots, and the like. In some implementations, a customer service request may be generated via a graphical user interface that is accessed on a customer device 110. For example, a customer may initiate a customer support (e.g., troubleshooting) request by inputting relevant information in a textbox, or similar user interface element, on a webpage associated with the merchant of a product.

The CCaaS system 150 comprises a computing system that is configured for receiving, processing, and routing customer contacts. In particular, customer service requests that are directed to a contact center associated with a certain entity, such as a merchant, employer, etc., may first be forwarded to the CCaaS system 150 and subsequently routed to one or more suitably selected service agents affiliated with the contact center. The CCaaS system 150 is communicably coupled to customer devices 110 and service agent devices 130, for example, via a computer network 120.

The CCaaS system 150 may execute various applications and services for managing customer contacts. In at least some implementations, the CCaaS system 150 may implement a service agent application. The service agent application may be executed to facilitate handling of service requests initiated by customers. In particular, the service agent application is configured to interface with service agent terminals 130 to enable various functions relating to receiving, processing, and transmitting of customer communications. For example, the service agent application may provide user interfaces for service agents to use in order to handle customer support requests, access customer and/or order information, and the like. Additionally, the service agent application may enable communications (e.g., voice calls, chat sessions, etc.) between customers and service agents, and determine how and where to forward specific customer communications. The service agent application may, for example, generate a communication session that corresponds to a customer service request. It will be understood that features and functionalities described above with respect to the service agent application may be implemented by one or more other applications, services, processes, systems, or engines.

As shown in FIG. 1, the CCaaS system 150 may be associated with a data store 155. The data store 155 may store data that is relevant for supporting customer service sessions. In some implementations, the data store 155 may store service agent data of a plurality of service agents who may be tasked with responding to service and/or support requests. The service agent data may include, for example, an identifier of a service agent, current sessions assigned to the agent, and a group/team identifier. In some implementations, the data store 155 may store session data for past sessions that are initiated based on service requests from customers. The session data may include, for example, a unique session identifier, session notes and/or research, and page cache.

While FIG. 1 illustrates the resource server 140 and the CCaaS system 150 as distinct entities, it will be understood that the two systems may be implemented by or as a single component of the networked system 100. In particular, various functionalities of the CCaaS system 150 (and more broadly, the associated CCaaS platform) may be implemented by a computing system that serves as the resource server 140.

The service agent terminal 130 is a computing system that is associated with a specific service agent. The service agent terminal 130 is configured to connect with the CCaaS system 150 in order to establish customer service sessions. In at least some implementations, the service agent terminal 130 may implement an application for interacting with the service agent application of the CCaaS system 150. In particular, client software, such as a web browser or a dedicated customer service application, provided on the service agent terminal 130 may be used for communicating with the service agent application of the CCaaS system 150. The client software may facilitate establishing customer service sessions, rendering content transmitted via the CCaaS system 150, and accessing customer and/or order information, among others.

The customer device 110, the service agent terminal 130, the resource server 140, and the CCaaS system 150 may be in geographically disparate locations. Put differently, the customer device 110 may be remote from at least one of the service agent terminal 130, the resource server 140, and the CCaaS system 150.

The customer device 110, the service agent terminal 130, the resource server 140, and the CCaaS system 150 are computer systems. The customer device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some implementations, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the resource server 140 may provide both data transfer processing (e.g., bill payment) and data holding (e.g., banking) functions. That is, the resource server 140 may be both a financial institution server and also a bill payment processing server. The resource server 140 may, in some implementations, be a proxy server, serving as an intermediary for requests from client devices 110 to register with an online service. For example, the resource server 140 may be a proxy connecting client devices 110 to servers or data stores processing product purchases and subsequent user registration at an online service offering the products.

Figure 2A:
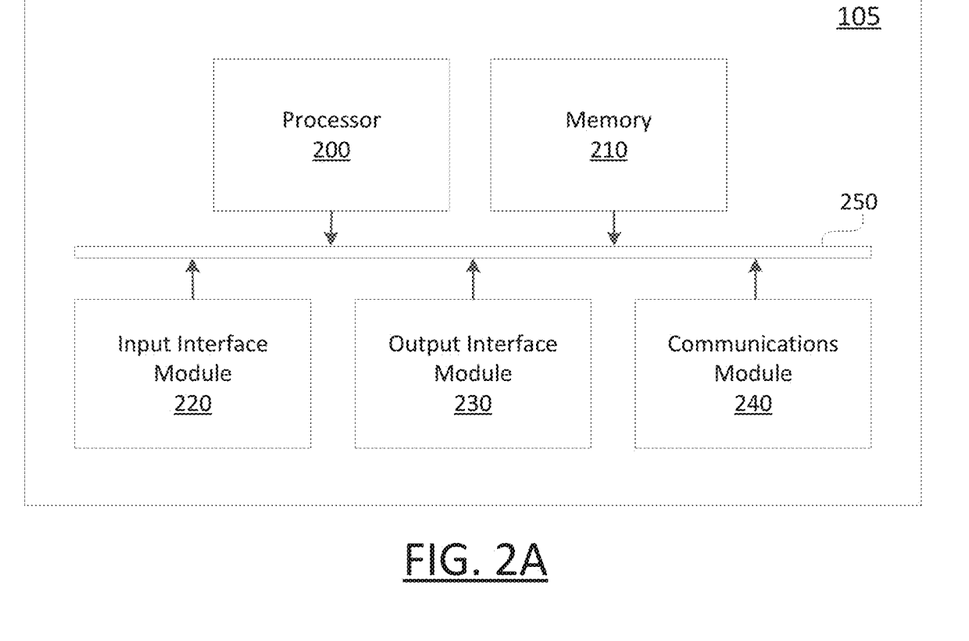
FIG. 2A is a high-level schematic diagram of an example computing device.

FIG. 2A is a high-level operation diagram of the example computing device 105. In some implementations, the example computing device 105 may be exemplary of one or more of the customer device 110, the service agent terminal 130, the resource server 140, and the CCaaS system 150. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. The processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some implementations, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some implementations, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 240 may allow the example computing device 105 to communicate using near-field communication (NFC), via Wi-Fi™, using Bluetooth™ or via some combination of one or more networks or protocols. Contactless payments may be made using NFC. In some implementations, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
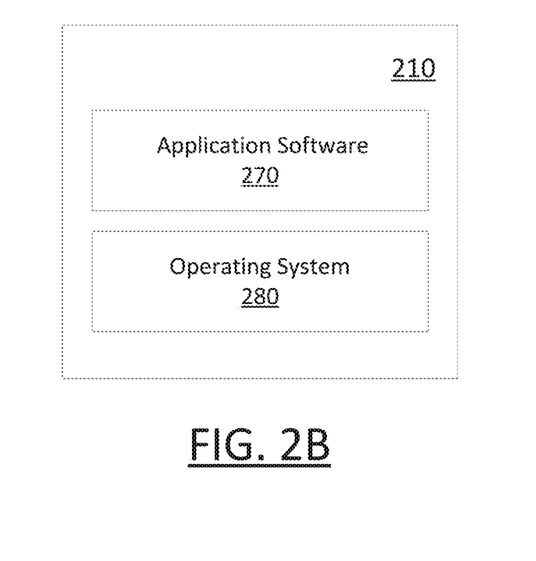
FIG. 2B shows a simplified organization of software components stored in memory of the example computing device of FIG. 2A.

FIG. 2B depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230 and the communications module 240. The operating system 280 may be, for example, Apple iOS™, Android™, Linux™, Microsoft Windows™, or the like. The application software 270 adapts the example computing device 105, in combination with the operating system 280, to operate as a device performing particular functions.

Figure 3:
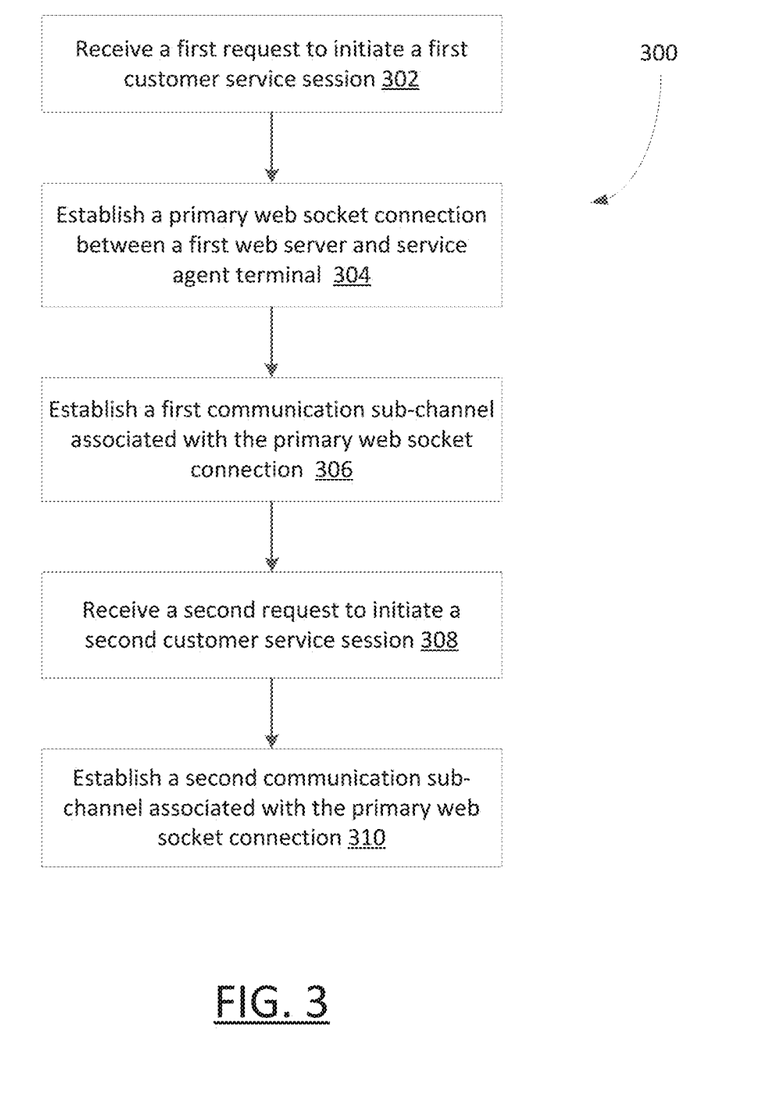
FIG. 3 shows, in flowchart form, an example method for processing customer service requests.

Reference is made to FIG. 3, which shows, in flowchart form, an example method 300 for processing customer contacts. Specifically, the method 300 allows for handling, in real-time, customer service requests that originate from customer devices. For example, the operations of the method 300 may be performed in establishing communication connections between a service agent terminal and a computing system associated with an on-demand contact center platform to enable a service agent to receive, process, and otherwise handle one or more customer service requests.

Operations 302 and onward are performed by one or more processors of computing devices such as, for example, the processor 200 (FIG. 2) of one or more suitably configured instances of the example computing device 105 (FIG. 2). The method 300 may be implemented, for example, by a computing system that is associated with a CCaaS platform, such as the CCaaS system 150 of FIG. 1. In particular, a computing system that is configured to provide functionalities of a CCaaS platform, including establishing customer service sessions between a service agent terminal and one or more customers, may perform all or part of the operations of method 300.

The methods described herein may be implemented in the context of a CCaaS platform that provides on-demand contact center services. The CCaaS platform may provide service agents with their own individual accounts with the platform. A service agent can authenticate and log in to the platform to access their own "workspace" from which they may engage in customer support services. In at least some implementations, a service agent may use a graphical user interface associated with a CCaaS platform on their own device/terminal to access customer service/support session data.

A computing system associated with a CCaaS platform receives customer service requests originating from customer devices. In operation 302, the computing system receives a first request to initiate a first customer service session. The first request may be associated with a customer service request such as, for example, be a technical support request, a product and/or order-related inquiry, customer feedback, and the like. More generally, the first request may be associated with an inbound customer interaction that is initiated by a customer. The first request is directed to a contact center associated with a specific entity, such as an employer, a business, a hospital, or the like. For example, the first request may be associated with a product inquiry for a product that is sold by a merchant. A purchaser or prospective purchaser of the product may generate the first request in order to establish a customer service session with a service agent associated with the merchant. As another example, the first request may be associated with a customer support request for troubleshooting a problem that is experienced by a customer. The customer may wish to establish a customer service session in order to obtain information for addressing and overcoming problems (e.g., information technology (IT) issues) which may be within the scope of knowledge and expertise of service agents of the contact center.

The first request may be generated using a particular mode of communication, such as a phone call (e.g., voice over IP call), a text message, a social media message, or the like. In some implementations, the first request may be initiated when a customer enters information using an online support form. The first request may indicate, among others, an identity of the requesting customer, a type of customer support requested, one or more relevant products, a description of the nature of the issue/problem, and the like.

The computing system may determine an identity of a suitable service agent for handling the first request and associated first customer service session. The determination of the service agent may depend on various factors, such as experience, area of expertise, demographic, etc. which may be compared with properties associated with the customer service request. A selection of a service agent may be made upon determining a match between the service agent factors and properties of the customer service request.

In operation 304, the computing system establishes a primary web socket connection between a first web server and a service agent terminal of the selected agent. The first web server may, in some implementations, be a server that administers or is associated with a CCaaS platform. For example, the first web server may be the computing system or another server that serves as a backend for a service agent application associated with a contact center. The first web server is configured to provide, to the service agent terminal, web content associated with customer service sessions. By way of example, the first web server may generate and transmit display data for presenting in a graphical user interface on the service agent terminal. The graphical user interface may enable the service agent to interact with customer service session data, such as receiving, accessing, and responding to customer inquiries or feedback.

To establish a web socket connection, the computing system causes a handshake request and response to be exchanged between the first web server and the service agent terminal. The handshake may start with an HTTP request/response, allowing servers to handle HTTP connections as well as web socket connections on the same port. Once the connection is established, the communication between the first web server and the service agent terminal may switch to bidirectional protocol that does not conform to the HTTP protocol. In particular, the first web server and the service agent terminal may send web socket data back and forth in full-duplex mode over a single TCP connection.

In some implementations, the primary web socket connection may be established between the first web server and a CCaaS application, such as a client application on a service agent terminal for interfacing with a service agent application associated with the computing system.

The computing system establishes a first communication sub-channel associated with the primary web socket connection, in operation 306. The first communication sub-channel represents a logical channel for communication corresponding to the first customer service session. Specifically, data that pertains to the first customer service session may be exchanged via the first communication sub-channel. The customer service session data may encompass, for example, text, images, video, etc. that capture content relating to the customer's request for service and/or support. The first communication sub-channel may be used for transmitting (all or subset of) customer service request data from the customer's device via the first web server to the service agent terminal, and for transmitting agent response data from the service agent terminal via the first webserver to the customer's device.

Figure 6A:
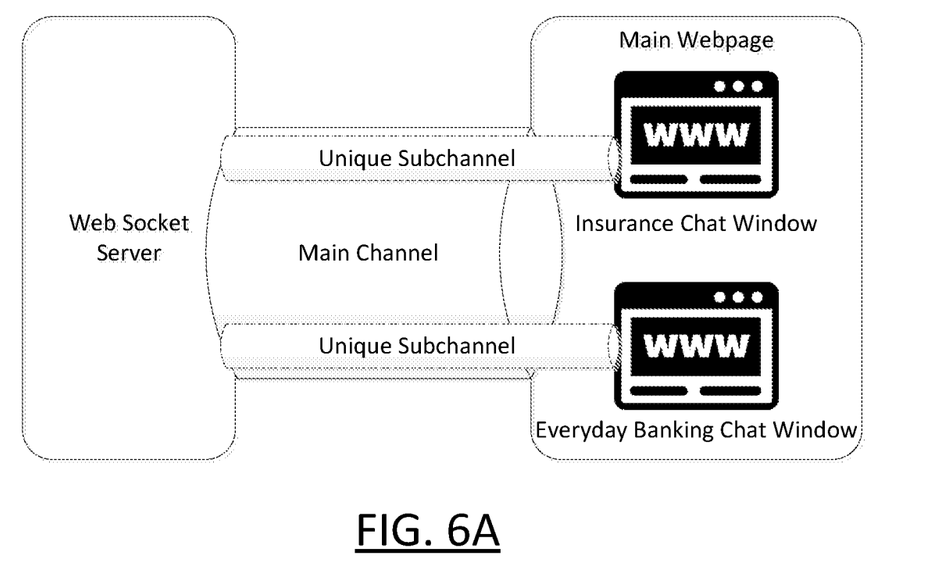
FIGS. 6A and 6B show example implementations of establishing communication channels between a web server and a service agent terminal.
Figure 6B:
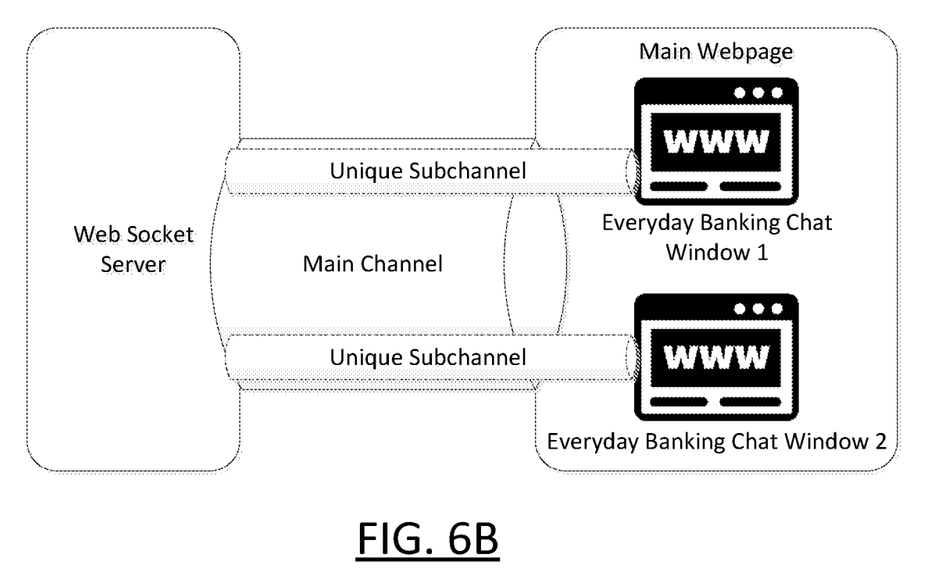

In operation 308, the computing system receives a second request to initiate a second customer service session. The second request may originate from the same customer as the first request or from a different customer. For example, the first request and corresponding customer service/support may be associated with a first line of business and the second request and corresponding service/support may be associated with a second line of business that is different from the first line of business. FIGS. 6A and 6B illustrate example embodiments in which a single web socket connection facilitates establishing a plurality of communication sub-channels between a web server and a service agent terminal. The multiple communication sub-channels of a single web socket connection may be used for customer service sessions of different lines of business (FIG. 6A) or the same lien of business (FIG. 6B).

In response to receiving the second request, the computing system establishes a second communication sub-channel associated with the primary web socket connection, in operation 310. The second communication sub-channel corresponds to the second customer service session. In particular, a different logical channel for communication within the same primary web socket connection is established specifically for the second request. In this way, a service agent may operate multiple customer service sessions concurrently while consuming only a single web socket connection. The customer service session data for the first customer session is only exchanged via the first communication sub-channel and the customer service session data for the second customer service session is only exchanged via the second communication sub-channel.

By extension, subsequent requests from customers to establish customer service sessions may involve establishing new communication sub-channels associated with the primary web socket connection. Each communication sub-channel may be associated with a unique channel identifier. The computing system may determine restrictions, if any, on a number of sub-channels that are permitted to be established concurrently for the primary web socket connection. If there are restrictions, the computing system may be configured to determine when a new web socket connection is required to be established in order for the service agent to be able to engage in additional customer service sessions concurrently. For example, a threshold number of permitted communication sub-channels may be defined. Upon determining that a request for a new customer service session would result in exceeding the threshold number of sub-channels, the computing system may be configured to establish an additional web socket connection between the first web server and the service agent terminal.

The use of communication sub-channels in place of web socket connections for new customer service sessions may allow for improved control of termination processes. When a service agent has finished their support services or otherwise desires to log off the CCaaS platform, they may wish to terminate, or "close", all currently active customer service sessions. In accordance with disclosed embodiments, the service agent may exit a graphical user interface associated with the CCaaS platform, and the primary web socket connection may be terminated. As a result, all communication sub-channels associated with the primary web socket connection are also caused to be terminated. Thus, a single termination operation can cause a plurality of sub-channels to be closed, without requiring any additional action by the service agent.

Figure 4:
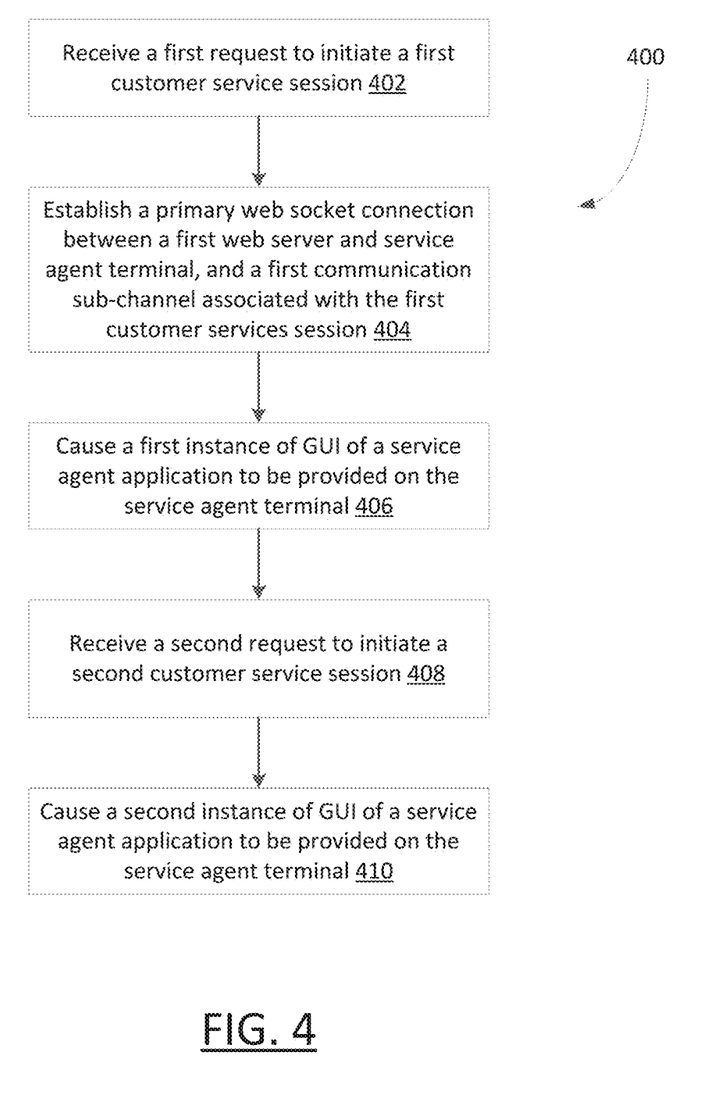
FIG. 4 shows, in flowchart form, an example method for controlling user interfaces for processing customer service requests.

Reference is made to FIG. 4, which shows, in flowchart form, an example method 400 for controlling user interfaces for processing customer service requests. Operations 402 and onward are performed by one or more processors of computing devices such as, for example, the processor 200 (FIG. 2) of one or more suitably configured instances of the example computing device 105 (FIG. 2). The method 400 may be performed, for example, by a computing system that is associated with an on-demand contact center platform, such as the CCaaS system 150 of FIG. 1. The operations of method 400 may be performed in addition to, or as alternatives of, one or more of the operations of method 300.

As described above, a computing system associated with a CCaaS platform may implement a service agent application to facilitate handling of customer service requests. A service agent terminal may be used to execute a corresponding client application for accessing the CCaaS platform. In particular, a service agent may log in to their account with the CCaaS platform using a graphical user interface associated with the client application on their device/terminal. The computing system (e.g., a web server) associated with the CCaaS platform may serve as the backend of the client application. The computing system may thus be configured to control the graphical user interface of the client application for enabling the service agent to access customer service session data.

In operation 402, the computing system receives a first request to initiate a first customer service session. The first request is associated with a requested support service, such as technical support, product and/or order inquiry, customer feedback, and the like. Upon receiving the first request, the computing system may be configured to determine a suitable service agent for handling the customer service session. The service agent may be selected based on agent factors, such as experience, area(s) of expertise, demographic, etc., and properties of the requested support service. In particular, the agent factors of one or more service agents may be compared with service properties of the requested support service and upon identifying a match, the computing system may select the service agent that is associated with the match.

The computing system establishes a primary web socket connection between a web server associated with the CCaaS platform and the service agent terminal of the selected service agent, in operation 404. In particular, a primary web socket connection is established with a client application on the service agent terminal for accessing the CCaaS platform. The computing system also establishes a first communication sub-channel associated with the first customer service session. The service session data of the first customer service session is exchanged via the first communication sub-channel between the web server and the service agent terminal.

In operation 406, the computing system causes a first instance of a graphical user interface of a client application to be provided on the service agent terminal. The graphical user interface presents display data associated with the first customer service session. For example, the display data may include information such as identifier of service agent, customer information, session browse history, selectable options for response, etc. The display data for the first graphical user interface instance is transmitted exclusively via the first communication sub-channel.

The computing system may receive additional requests for initiating customer service sessions with the selected service agent. That is, at least one subsequent request (i.e., a second request) may be received that is suitable for forwarding to the selected service agent, in operation 408. Rather than establishing a new web socket connection between the web server and the service agent terminal, the computing system may establish a new (second) communication sub-channel associated with the same web socket connection that had previously been set up in connection with the first request. The service session data of the second customer session is exchanged via the second communication sub-channel between the web server and the service agent terminal.

In particular, the web server may transmit display data associated with the graphical user interface of the client application for accessing the CCaaS platform. The computing system causes a second instance of the graphical user interface to be provided on the service agent terminal, in operation 410. The display data for the second graphical user interface instance is transmitted exclusively via the second communication sub-channel.

The computing system may implement or access a message broker module that is configured to identify a GUI instance of the client application that is associated with display data transmitted from the web server. That is, a message broker module may determine, based on the display data, which GUI instance is to receive the display data. In at least some implementations, a communication sub-channel identifier may be included in communications between the web server and the client application on the service agent terminal. An identifier for each communication sub-channel associated with an established web socket connection may be assigned by the computing system. The identifier may allow the computing system and/or the message broker module to cause a correct GUI instance to be updated when display data is received from the web server.

Figure 5:
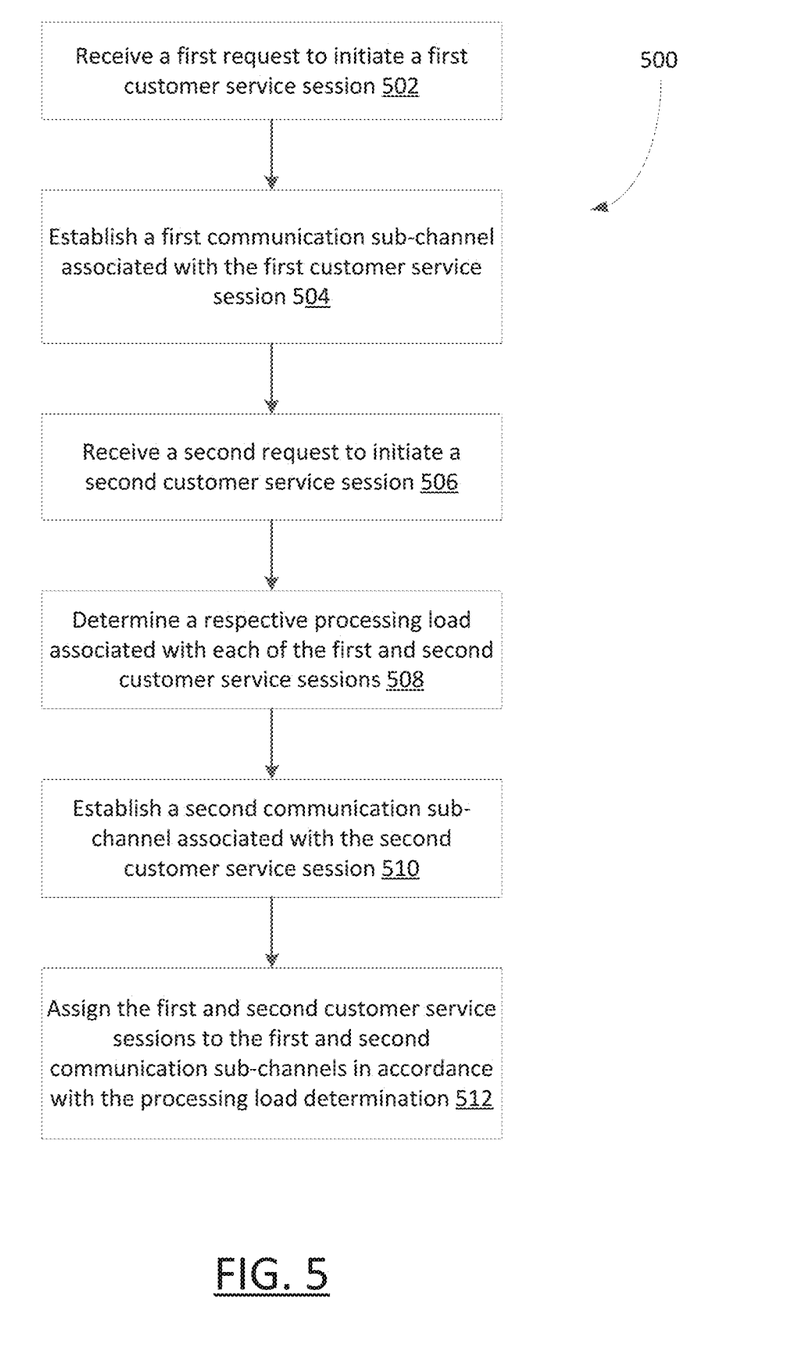
FIG. 5 shows, in flowchart form, an example method for routing customer service requests on multiple communication channels.

Reference is now made to FIG. 5, which shows an example method 500 for routing customer service requests on multiple communication channels. Operations 502 and onward are performed by one or more processors of computing devices such as, for example, the processor 200 (FIG. 2) of one or more suitably configured instances of the example computing device 105 (FIG. 2). The method 500 may be performed, for example, by a computing system that is associated with an on-demand contact center platform, such as the CCaaS system 150 of FIG. 1. The operations of method 500 may be performed in addition to, or as alternatives of, one or more of the operations of methods 300 and 400.

In operation 502, the computing system receives a first request to initiate a first customer service session. The first request is associated with a requested support service, such as technical support, product and/or order inquiry, customer feedback, and the like. Upon receiving the first request, the computing system may be configured to determine a suitable service agent for handling the customer service session. The service agent may be selected based on agent factors, such as experience, area(s) of expertise, demographic, etc., and properties of the requested support service. In particular, the agent factors of one or more service agents may be compared with service properties of the requested support service and upon identifying a match, the computing system may select the service agent that is associated with the match.

In operation 504, the computing system establishes a primary web socket connection between a web server associated with the CCaaS platform and the service agent terminal, and a first communication sub-channel within the primary web socket connection. In particular, a primary web socket connection is established with a client application on the service agent terminal for accessing the CCaaS platform.

The computing system subsequently receives a second request to initiate a second customer service session, in operation 506. The second request may originate from the same customer as the first request or a different customer. In operation 508, the computing system determines a respective processing load associated with each of the first and second customer service sessions. Specifically, the computing system may determine an average processing load for handling session types associated with the first and second customer service sessions.

In operation 510, the computing system establishes a second communication sub-channel associated with the second customer service session. The second communication sub-channel is within the same primary web socket connection associated with the first request. That is, both the first and second communication sub-channels subsist within the same web socket connection established between the web server and the service agent terminal.

In operation 512, the computing system assigns the first and second customer service sessions to the first and second communication sub-channels in accordance with the processing load determination. In particular, the assignment of the customer service sessions may be based on bandwidth considerations associated with the communication sub-channels. If the first customer service session is of a type that is associated with a higher processing load, that session may be assigned to use a communication sub-channel with higher bandwidth capacity. As a result, the customer service session of a type having lower average processing load may be assigned to a communication sub-channel with lower bandwidth capacity.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:
1. A computing system, comprising:
 a processor; and
 a memory coupled to the processor, the memory storing computer-executable instructions that, when executed by the processor, configure the processor to:

receive a plurality of requests to initiate customer service sessions;

establish a primary web socket connection between a first web server and a service agent terminal; and for each of the plurality of requests, establish a communication sub-channel associated with the primary web socket connection, each communication sub-channel corresponding to a respective customer service session.

2. The computing system of claim 1, wherein the instructions, when executed, further configure the processor to, for each of the plurality of requests, cause a service agent session to be initiated at the service agent terminal using a respective communication sub-channel.

3. The computing system of claim 2, wherein each service agent session is associated with a respective graphical user interface (GUI) instance.

4. The computing system of claim 1, wherein the instructions, when executed, further configure the processor to:

receive a termination command at the service agent terminal; and in response to receiving the terminal command, cause the primary web socket connection to be terminated together with all of the communication sub-channels.

5. The computing system of claim 1, wherein establishing the primary web socket connection comprises establishing a web socket connection between the first web server and a contact-center-as-a-service (CCaaS) application on the service agent terminal.

6. The computing system of claim 1, wherein each of the communication sub-channels is associated with a unique identifier generated by a CCaaS application.

7. The computing system of claim 6, wherein the instructions, when executed, further configure the processor to:

receive, from the first web server, a message in connection with a customer service session;

select one of the communication sub-channels to forward the message to based on determining a first unique identifier associated with the message; and forward the message to the selected communication sub-channel.

8. The computing system of claim 7, wherein the instructions, when executed, further configure the processor to cause a GUI instance associated with the selected communication sub-channel to be updated based on the message.

9. The computing system of claim 1, wherein a first one of the communication sub-channels is associated with a first line of business and wherein at least one second communication sub-channel is associated with a second line of business that is different from the first line of business.

10. The computing system of claim 1, wherein customer service session data for a first customer service session is only sent via a first communication sub-channel and wherein customer service session data for a second customer service session is only sent via a second communication sub-channel that is different from the first communication sub-channel.

11. A computer-implemented method, comprising:

receiving a plurality of requests to initiate customer service sessions;

establishing a primary web socket connection between a first web server and a service agent terminal; and for each of the plurality of requests, establishing a communication sub-channel associated with the primary web socket connection, each communication sub-channel corresponding to a respective customer service session.

12. The method of claim 11, further comprising, for each of the plurality of requests, causing a service agent session to be initiated at a service agent terminal using a respective communication sub-channel.

13. The method of claim 12, wherein each service agent session is associated with a respective graphical user interface (GUI) instance.

14. The method of claim 11, further comprising:

receiving a termination command at the service agent terminal; and in response to receiving the terminal command, causing the primary web socket connection to be terminated together with all of the communication sub-channels.

15. The method of claim 11, wherein establishing the primary web socket connection comprises establishing a web socket connection between the first web server and a contact-center-as-a-service (CCaaS) application on the service agent terminal.

16. The method of claim 11, wherein each of the communication sub-channels is associated with a unique identifier generated by a CCaaS application.

17. The method of claim 16, further comprising:

receiving, from the first web server, a message in connection with a customer service session;

selecting one of the communication sub-channels to forward the message to based on determining a first unique identifier associated with the message; and forwarding the message to the selected communication sub-channel.

18. The method of claim 17, further comprising causing a GUI instance associated with the selected communication sub-channel to be updated based on the message.

19. The method of claim 11, wherein a first one of the communication sub-channels is associated with a first line of business and wherein at least one second communication sub-channel is associated with a second line of business that is different from the first line of business.

20. The method of claim 11, wherein customer service session data for a first customer service session is only sent via a first communication sub-channel and wherein customer service session data for a second customer service session is only sent via a second communication sub-channel that is different from the first communication sub-channel.

* * * * *